(12) United States Patent
Fälth

(10) Patent No.: US 11,502,498 B2
(45) Date of Patent: Nov. 15, 2022

(54) POWER CABLE TERMINATION SYSTEM

(71) Applicant: NKT HV Cables AB, Lyckeby (SE)

(72) Inventor: Fredrik Fälth, Lund (SE)

(73) Assignee: NKT HV Cables AB, Lyckeby (SE)

( * ) Notice: Subject to any disclaimer, the term of this patent is extended or adjusted under 35 U.S.C. 154(b) by 0 days.

(21) Appl. No.: 17/595,534

(22) PCT Filed: Jun. 4, 2020

(86) PCT No.: PCT/EP2020/065480
§ 371 (c)(1),
(2) Date: Nov. 18, 2021

(87) PCT Pub. No.: WO2020/245269
PCT Pub. Date: Dec. 10, 2020

(65) Prior Publication Data
US 2022/0200260 A1   Jun. 23, 2022

(30) Foreign Application Priority Data
Jun. 7, 2019   (EP) ..................................... 19179006

(51) Int. Cl.
*H02G 15/02* (2006.01)
*H02G 15/06* (2006.01)
*H02G 15/10* (2006.01)

(52) U.S. Cl.
CPC ............. *H02G 15/06* (2013.01); *H02G 15/10* (2013.01)

(58) Field of Classification Search
CPC ........ H02G 15/06; H02G 15/10; H02G 15/08; H02G 15/103; H02G 15/064;
(Continued)

(56) References Cited

U.S. PATENT DOCUMENTS 4,090,767 A * 5/1978 Tregoning ........... H01R 13/516
439/607.41
4,130,334 A * 12/1978 Anderson ................ H01R 4/64
439/497
(Continued)

FOREIGN PATENT DOCUMENTS

EP   2712473 A2   4/2014
EP   2712473 B1   12/2016
(Continued)

OTHER PUBLICATIONS

Seichem; Wire and Cables: "Conductor resistance"; Feb. 28, 2017; https://www.siechem.com/wp-content/uploads/2017/02/conductor-Resistance.pdf; Accessed: Nov. 12, 2021; 4 Pages.
(Continued)

*Primary Examiner* — Angel R Estrada
(74) *Attorney, Agent, or Firm* — Whitmyer IP Group LLC

(57) ABSTRACT

A power cable termination system including: a power cable having a power cable conductor and a power cable insulation system configured to electrically insulate the power cable conductor, a termination cable having a termination cable conductor and a termination cable insulation system configured to electrically insulate the termination cable insulation system, wherein the termination cable is at least one order of magnitude shorter than the power cable, wherein the termination cable conductor has an electrical resistance which is lower than the electrical resistance of the power cable conductor and/or the termination cable insulation system has a higher insulation resistance per unit length than the power cable insulation system, a joint configured to join the power cable and the termination cable, and a cable termination device configured to terminate the termination cable.

18 Claims, 1 Drawing Sheet

(58) Field of Classification Search
CPC ...... H02G 15/105; H02G 15/22; H02G 15/23; H02G 15/24; H02G 15/184; H01B 1/00; H01B 1/02; H02B 13/02; H02B 13/00; H01R 13/5804; H01R 13/58
USPC .......... 174/75 R, 68.1, 70 R, 74 R, 78, 88 C, 174/73.1; 439/865, 869, 877, 460, 461, 439/449, 207
See application file for complete search history.

(56) References Cited

U.S. PATENT DOCUMENTS

| | | | | | |
|---|---|---|---|---|---|
| 4,245,134 | A | * | 1/1981 | Oldham | H01R 9/05 174/880 |
| 4,831,214 | A | * | 5/1989 | Wilck | H02G 15/184 174/73.1 |
| 8,037,705 | B2 | * | 10/2011 | Schmidt | F16L 59/141 439/207 |
| 8,137,124 | B2 | * | 3/2012 | Shaojun | H01R 13/53 439/352 |
| 8,319,101 | B2 | * | 11/2012 | Adachi | H02G 15/064 174/73.1 |
| 8,525,025 | B2 | * | 9/2013 | Li | H01R 9/05 174/73.1 |
| 10,135,177 | B2 | * | 11/2018 | Sica | H02G 15/18 |
| 2017/0250499 | A1 | | 8/2017 | Sica et al. | |

FOREIGN PATENT DOCUMENTS

| | | |
|---|---|---|
| JP | H04325821 A | 11/1992 |
| JP | 4615258 B2 | 1/2011 |
| WO | 9709762 A1 | 3/1997 |
| WO | 9845917 A1 | 10/1998 |

OTHER PUBLICATIONS

International Preliminary Report on Patentability; Application No. PCT/EP2020/065480; dated Aug. 2, 2021; 18 Pages.
International Search Report and Written Opinion of the International Searching Authority; Application No. PCT/EP2020/065480; Completed: Jul. 20, 2020; dated Jul. 29, 2021; 17 Pages.
Written Opinion of the International Preliminary Examinig Authority; Application No. PCT/EP2020/065480; dated Apr. 19, 2021; 7 Pages.

* cited by examiner

POWER CABLE TERMINATION SYSTEM

TECHNICAL FIELD

The present disclosure relates to power cables, in particular to power cable termination systems including a cable termination.

BACKGROUND

Cable termination devices are used to terminate power cables for example at a landfall or substation. In operation, high currents flow through the conductor of the power cable, causing the power cable to heat up. This is especially problematic inside the cable termination device, which is a confined space in which the external layer(s) of the power cable, including the outer semiconducting layer which usually is connected to ground, typically have been peeled off.

High temperature in cable termination devices has a number of disadvantages. For example, it increases the risk for thermal runaway in solid insulation materials (cross-linked polymer (XLPE), rubbers), mechanical movement increases due the larger thermal expansion, chemical reactions are speeded up and new chemical reactions could occur due to threshold temperature effects. Moreover, DC electric properties are temperature dependent, and thus high temperatures may be a major problem in DC applications.

Cable termination devices are also subjected to high electric fields, especially in the above-mentioned region where the outer semiconducting layer has been peeled off. Normally a stress cone or field-grading adapter is placed around the power cable in this region, to reduce the electric field. The electric fields provide limits in terms of which type of oil or gas is used for insulation purposes in the cable termination device, determined by operating pressure and material breakdown strength. Furthermore, a high electric field puts considerable stress on solid insulation components such as the field-grading adapter and/or the stress cone.

Both problems are difficult to handle in themselves, and in combination they create even more challenges when designing cable termination devices.

There are multiple ways manufacturers try to overcome problems with high electric fields in solid materials, insulating fluids, and air. The focus is on improved design, optimized materials, surface treatments, increasing gas pressure, etc., at great cost and efforts. Often new concepts and ideas are tried with high potential failure risk.

One solution that has been proposed is that of cable thickening of the cable end inside the termination, either by lapping/vulcanization or by means of insulating adapters of similar properties as the cable insulating properties. This approach is both time-consuming and associated with considerable risks. For example, the quality of work must be of the highest standard. Moreover, the preparation of the outer surface of the increased diameter cable end is difficult, which increases the risk for interface problems. There may also be a material mismatch between the insulating adapter and XLPE. Furthermore, the added insulation thickness also means increased thermal insulation. Thus, the risk for thermal problems will increase with this solution.

Solutions addressing high temperatures include forced cooling, or modifying materials for better thermal properties. Those solutions add complexity/risk and cost of development at only a limited temperature reduction.

SUMMARY

In view of the above, an object of the present disclosure is to provide a power cable termination system which solves, or at least mitigates, the problems of the prior art.

There is hence provided a power cable termination system comprising: a power cable having a power cable conductor and a power cable insulation system configured to electrically insulate the power cable conductor, a termination cable having a termination cable conductor and a termination cable insulation system configured to electrically insulate the termination cable conductor, wherein the termination cable is at least one order of magnitude shorter than the power cable, wherein the termination cable conductor has an electrical resistance which is lower than an electrical resistance of the power cable conductor and/or the termination cable insulation system has a higher insulation resistance per unit length than the power cable insulation system, a joint configured to join the power cable and the termination cable, and a cable termination device configured to terminate the termination cable.

Due to the lower electrical resistance, the temperature in the termination cable conductor may be reduced considerably. The cable termination device may therefore be scaled down, resulting in a smaller physical as well as environmental footprint. This may for example allow for different insulation material than those currently being used. Additionally, due to lower temperature, the general risk may be reduced, e.g. due to less thermal expansion.

The joint may be a transition joint or an asymmetric joint.

A higher insulation resistance per unit length reduces the electric field in the cable termination device considerably, since the termination cable is instead of the power cable inserted into the cable termination device. The cable termination device may therefore be scaled down, resulting in a smaller physical as well as environmental footprint. Alternatively and/or additionally, a dielectric fluid in the cable termination device which is less environmentally harmful than for example SF6 may be used.

Due to the greatly increased margin of safety a more economic design may be provided and/or the performance may be increased.

Moreover, the same design of the cable termination device can be used for a great number of different power cable types of the same voltage rating. In particular, one size may be used with a number of power cable types/models for a certain voltage rating, since the cable termination device is designed for use with the termination cable. Hence, only the joint would need to be changed for different power cable types of a certain voltage rating. As a result, the termination cable as well as the cable termination device may be pre-produced and stored on the shelf. Fast delivery of the cable termination device and spare parts may thereby be provided. It would also be possible to pre-install the cable termination device with the termination cable, which would greatly reduce the installation time on site.

The cable termination device is thus not designed based on the project cable/delivery cable, i.e., the power cable which has been order for a particular project, but instead on the termination cable, which is connected to the delivery cable by means of the transition joint. The cable termination device is hence configured to be directly connected to the termination cable.

The power cable termination system will due to its simplicity reduce the costs, the installation time, and benefit risk management.

The termination cable is essentially a joint section or splice section which connects the power cable and the cable termination device in the direct vicinity of the cable termination device.

According to one embodiment the termination cable is a plurality of orders of magnitudes shorter than the power cable. The termination cable may for example be at least two orders of magnitude shorter than the power cable.

According to one embodiment the power cable conductor and the termination cable conductor have the same electrical resistivity, wherein the termination cable conductor has a larger cross-sectional area than the power cable conductor.

According to one embodiment the termination cable has a total length which is at most 100 metres.

The termination cable conductor may preferably comprise or consist of copper. The power reduction in the termination cable conductor may thereby be minimised independently of the material of the power cable conductor. The power reduction in the termination cable conductor per unit length is proportional to the resistivity of the termination cable conductor times the cross-sectional area of the power cable conductor divided by the resistivity of the power cable conductor times the cross-sectional area of the termination cable conductor. The termination cable conductor could alternatively be made of for example aluminium.

As an example, a termination cable conductor made of aluminium may for example be joined with a power cable having a power cable conductor made of copper. In this case the termination cable conductor unit length resistance, i.e. resistivity/cross-section must be lower than the power cable conductor unit length resistance.

According to one embodiment the power cable is connected to the joint, the termination cable is connected to the joint, and the termination cable is directly connected to the cable termination device.

According to one embodiment the termination cable has a portion mounted inside the cable termination device.

According to one embodiment the cable termination device comprises an electrically insulating fluid. The electrically insulating fluid may for example be insulating oil or $SF_6$ gas.

According to one embodiment the cable termination device is a dry cable termination device. The cable termination device may comprise a solid insulation within its enclosure. The dry cable termination has such a solid insulation system inside its enclosure, which does not require an electrically insulating fluid, such as a liquid or $SF_6$ gas, inside the dry cable termination.

According to one embodiment the cable termination device has an enclosure filled with a gel. The gel is electrically insulating. The gel may be a liquid when the enclosure is filled with the gel, and it may solidify somewhat afterwards to become more rubberlike. The viscosity of the gel may change between assembly and operation.

According to one embodiment the termination cable is a power cable accessory. The termination cable is hence an accessory to the power cable just like the cable termination device. Its only purpose is to act as a dimensioning interface between the power cable and cable termination device to reduce the temperature and/or the electric field inside the cable termination device.

According to one embodiment the power cable is a high voltage power cable.

According to one embodiment the power cable is a land power cable or a submarine power cable. In the case of a submarine power cable, the power cable may be provided with one or more armouring layers. The termination cable may in this case be provided with one or more armouring layers, but would typically not be provided with any armouring layer(s).

According to one embodiment the power cable is a DC power cable or an AC power cable.

According to one example, the joint is a transition joint, wherein the power cable insulation system comprises a first type of insulating material and the transition cable insulation system comprises a second type of insulating material. For example, the first type of insulating material may comprise a thermoplastic and the second type of insulating material may comprise cross-linked polyethylene (XLPE). The termination cable is designed to give lower or equal electric stress in the cable termination device.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc.", unless explicitly stated otherwise.

BRIEF DESCRIPTION OF THE DRAWINGS

The specific embodiments of the inventive concept will now be described, by way of example, with reference to the accompanying drawings, in which.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
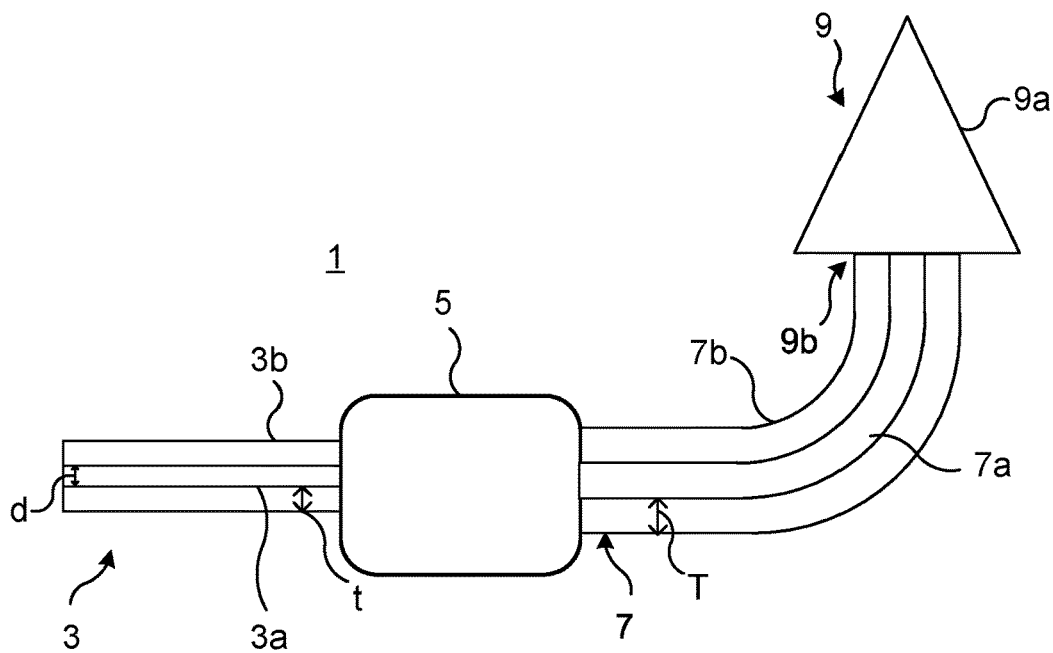
FIG. 1 schematically shows an example of an example of a power cable termination system.

FIG. 1 depicts an example of a power cable termination system 1. The exemplified power cable termination system 1 is a high voltage power cable termination system 1. With high voltage is meant voltages from 72 kV and upwards. The power cable termination system 1 could alternatively be configured for use with lower voltages than 72 kV.

The exemplified power cable termination system 1 is a DC power cable termination system for DC applications but could alternatively be an AC power cable termination system for AC applications.

The power cable termination system 1 comprises a power cable 3. The power cable 3 is a "delivery power cable", i.e. one which with pre-specified specifications/characteristics has been ordered for a certain grid project, offshore or onshore.

The power cable 3 comprises a conductor 3a and a power cable insulation system 3b. The power cable 3 comprises one or more additional layers provided radially outside of the power cable insulation system 3b but are for simplicity not shown in FIG. 1. The exemplified power cable insulation system 3b may be a solid insulation layer configured to electrically insulate the power cable conductor. The solid insulation layer may for example comprise or consist of XLPE but could alternatively comprise other solid insulation materials such as thermoplastic materials.

The power cable conductor 3a has a first cross-sectional area. In examples in which the power cable conductor 3a has a circular or essentially circular cross-section, the power cable conductor 3a may have a first conductor diameter d.

The power cable 3 has a layer provided directly radially inside of the outermost layer of the power cable 3, which layer a first diameter. The outermost layer is typically an outer sheath or outer serving of the power cable 3.

The power cable insulation system 3b may have a radial insulation thickness t. The insulation thickness t is the thickness of the power cable insulation system 3b in the radial direction.

In embodiments in which the power cable is an AC power cable, the power cable typically comprises a plurality of cores, for example three in the case of a three-phase power cable. Each core comprises a respective conductor and power cable insulation system as previously described. The cores are preferably stranded with a core stranding pitch.

Figure 2:
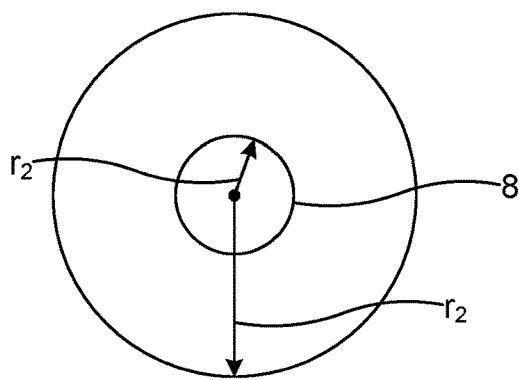
FIG. 2 schematically depicts parameters for the insulation resistance.

The power cable termination system 1 furthermore comprises a joint 5, such as a transition joint or an asymmetric joint and a termination cable 7. The joint 5 is configured to join the power cable 3 and the termination cable 7. The joint 5 may be a prefabricated joint or a flexible vulcanized joint. An example of a prefabricated transition joint 5 is shown in FIG. 2 and will be described in what follows.

The power cable termination system 1 furthermore comprises a cable termination device 9.

The termination cable 7 is not a delivery power cable. It is thus generally not a power cable that has been ordered for a specific grid project. The termination cable 7 is a power cable accessory, just like the cable termination device 9. The termination cable 7 is hence an accessory to the power cable 3. The power cable 3 is in this context typically several kilometres long, for example often more than 10 kilometres long. The termination cable 7 has a length that is one or more orders of magnitudes shorter than the length of the power cable 3. The termination cable 7 may typically be no longer than 100 metres. The termination cable 7 is configured to act as a terminating connection which connects the power cable 3 with the cable termination device 9. The termination cable 7 normally has no section which is installed below ground or subsea.

The termination cable 7 has a termination cable conductor 7a and a termination cable insulation system 7b. The termination cable 7 comprises one or more additional layers provided radially outside of the termination cable insulation system 7b but are for reasons of simplicity not shown.

The exemplified termination cable insulation system 7b comprises a solid insulation layer. The solid insulation layer may for example comprise or consist of XLPE, but could alternatively comprise other solid insulation materials such as thermoplastic materials.

The termination cable 7 has a layer directly radially inside of the outermost layer of the termination cable 7, which has a second diameter. The outermost layer is typically an outer sheath or outer serving of the termination cable 7. The second diameter may be larger than the first diameter. The second diameter may for example be at least 1.1 times the first diameter, such as at least 1.2 times the first diameter, such as at least 1.3 times, 1.4 times, or 1.5 times the first diameter. It is to be noted that in some examples, the outer diameter of the termination cable 7 and the power cable 3 may be the same.

The termination conductor 7a has a second cross-sectional area. In examples in which the termination cable conductor 7a has a circular or essentially circular cross-section, the termination cable conductor 7a may have a second conductor diameter D. According to the example in FIG. 1, the second conductor diameter D is larger than the first conductor diameter d. It is to be noted that in some examples, the first conductor diameter d and the second conductor diameter D may be the same. The power cable conductor 3a however has a higher electrical resistance than the termination cable conductor 7a. The termination cable conductor 7a hence has less thermal power generated than the power cable conductor 3a. If the power cable conductor 3a and the termination cable conductor 7a are made of the same material, the lower electrical resistance in the termination cable conductor 7a may be achieved by making the second conductor diameter D larger than the first conductor diameter d. Another alternative is to make the termination cable conductor 7a of a material which has a lower resistivity than the power cable conductor 3a. For example, the termination cable conductor 7a may be made of copper and the power cable conductor 3a may be made of aluminium. A combination of different conductor diameters and different conductor materials of the termination cable conductor and the power cable conductor is also envisaged.

According to the example shown in FIG. 1, the first cross-sectional area is smaller than the second cross-sectional area. To this end, the cross-sectional area of the power cable conductor 3a is smaller than the cross-sectional area of the termination cable conductor 7a in any or essentially any cross-section, taken anywhere or at least along a majority of the length of the power cable 3 and along the length of the termination cable 7. The cross-sectional area of the termination cable conductor 7a is preferably constant or essentially constant. Due to the greater cross-sectional area of the termination cable conductor 7a, the heat generation may be reduced. In particular, due to the in greater cross-sectional area the resistance of the termination cable conductor 7a becomes smaller than for the power cable conductor 3a, resulting in less heat development.

The termination cable insulation system 7b has a higher insulation resistance per unit length than the power cable insulation system 3b. The higher insulation system resistance per length unit may be implemented by making the termination cable insulation system 7b thicker than the power cable insulation system 3b in case these two insulation systems are made of the same material and hence have the same resistivity ρ, and/or by providing the termination cable insulation system 7b with a higher resistivity p than the power cable insulation system 3b. This may be obtained by making the termination cable insulation system 7b from a different material than the power cable insulation system 3b.

FIG. 2 schematically shows a cross-section of a power cable for the definition of the insulation resistance. The insulation resistance $R_{ins}$ per unit length may be expressed as:

$$R_{ins} = \frac{\rho}{2\pi} \ln\left(\frac{r_2}{r_1}\right)$$

where $r_2$ is the outer diameter of the insulation system and $r_1$ is the inner diameter of the insulation system. As can be seen in FIG. 2, the inner diameter $r_1$ is arranged radially outwards from the conductor 8. In use of the power cable, the inner surface of the insulation system, i.e. at the inner diameter $r_1$, typically has a voltage potential at the nominal voltage of the power, and the outer surface of the insulation system, i.e. at the outer diameter $r_2$, is typically grounded.

The termination cable insulation system 7b may have a radial insulation thickness T. The insulation thickness T is the thickness of the termination cable insulation system 7b in the radial direction.

According to the example shown in FIG. 1, the insulation thickness T of the termination cable insulation system 7b is greater than the insulation thickness t of the power cable insulation system 3b. The electric field may thereby be reduced, in particular in the cable termination device 9, when the termination cable 7 and the cable termination device 9 have been connected. In case two different insulation systems, i.e. a power cable insulation system which differs from the termination cable insulation system, are connected via a transition joint, the termination cable insulation system may have electrical properties that allows for thinner cable insulation than the power cable insulation system, yet accomplish a field reduction in e.g. the cable termination device.

The insulation thickness T may for example be at least 10% larger, than the insulation thickness t. According to some examples, the insulation thickness T and the insulation thickness t may be the same. In some examples, the electrical resistance of the termination cable conductor and the power cable conductor may be the same, but the insulation thickness T and the insulation thickness t may differ.

In some embodiments only one of the cross-sectional area of the termination cable conductor and the thickness of the termination cable insulation system is greater than the corresponding feature of the power cable. Typically, this results in that the outer diameter of the termination cable is greater than the outer diameter of the power cable.

The cable termination device 9 has an elongated hollow body 9a. The body 9a may be made of an insulating material such as porcelain, rubber or a polymeric material. The body 9a may be provided with a plurality of sheds arranged one after the other in the axial direction of the body 9a.

The body 9a has a first opening 9b configured to receive an end portion of the termination cable 7. The termination cable 7 is installed in the cable termination device 9 in a known manner, which will not be described in any further detail herein. For example, a field-grading adapter and/or stress cone may be mounted around a peeled-off portion of the termination cable 7 inside the body 9a. The cable termination device 9 is sealed and may be filled with an electrically insulating fluid. The electrically insulating fluid may for example be a gas such as SF6 or a dielectric fluid such as oil.

The cable termination device 9 could alternatively be a gas insulated substation (GIS) termination which has a body made of an electrically conducting material that is grounded.

Beneficially, for different cable types of a specific voltage rating of the power cable 3, the termination cable 7 and the cable termination device 9 may have the same design and can be produced and stored on the shelf beforehand, only the transition joint 5 needs to be adapted to the power cable. Additionally, due to reduced temperature the size of the cable termination device 9 may be reduced. The size of the cable termination device 9 may also be reduced due to the reduced electric field. Alternatively and/or additionally, due to the lower electric fields an insulating fluid inside the cable termination device 9 may be selected to be more environmental friendly and less hazardous in terms of health. Also, according to one example improved fire properties due to e.g., changing from flammable oil to one that isn't, is envisaged.

Figure 3:
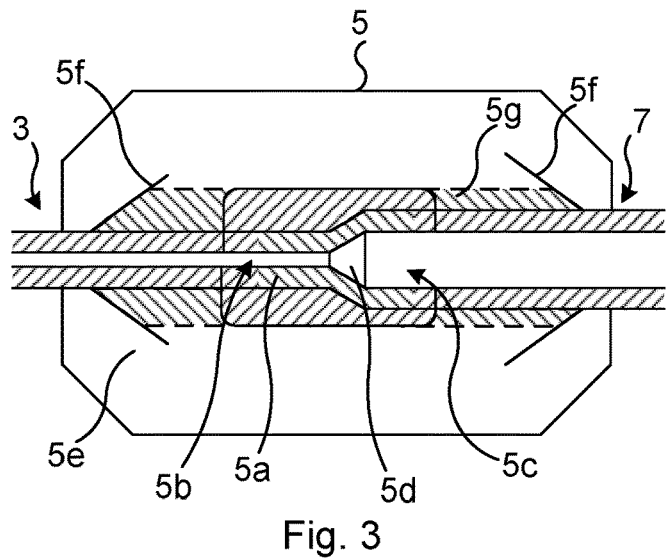
FIG. 3 schematically shows a longitudinal section of a transition joint.

FIG. 3 schematically shows one example of joint 5 in the form of a prefabricated transition joint. The joint 5 may comprise an elongated connector 5a. The connector 5a may be made of metal, such as copper, aluminium or stainless steel. The connector 5a has a first axial opening 5b at a first end, configured to receive the power cable conductor 3a. The connector 5a has a second axial opening 5c at a second end opposite to the first end, configured to receive the termination cable conductor 7a. The second opening 5c may have a larger diameter than the first opening 5b. The joint 5 may also include a joint member 5d for mechanically connecting the end faces of the power cable conductor 3a and the termination cable conductor 7a. The connector 5a may be provided with means, such as screws, bolts or clamps, for fixating the power cable conductor 3a and the termination cable conductor 7a to the connector 5a. Alternatively or additionally, the power cable conductor 3a and the termination cable conductor 7a could for example be welded to the connector 5a, or the power cable conductor and the termination cable conductor could be welded to each other without using a connector. The joint 5 may also comprise a main solid insulation 5e, cable end deflectors 5f and one or more resistive field grading layers 5g for providing geometrical and field grading. The material of the field grading layers and/or deflectors may be resistive and/or capacitive.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A power cable termination system comprising:
a power cable having a power cable conductor and a power cable insulation system configured to electrically insulate the power cable conductor,
a termination cable having a termination cable conductor including copper or being made of aluminium and a termination cable insulation system configured to electrically insulate the termination cable conductor, wherein the termination cable is at least one order of magnitude shorter than the power cable,
wherein the termination cable conductor has an electrical resistance which is lower than the electrical resistance of the power cable conductor and provides a power reduction in the termination cable conductor per unit length, the power reduction in the termination cable conductor per unit length being proportional to the resistivity of the termination cable conductor times the cross-sectional area of the power cable conductor divided by the resistivity of the power cable conductor times the cross-sectional area of the termination cable conductor, and/or the termination cable insulation system has a higher insulation resistance per unit length than the power cable insulation system,
a joint configured to join the power cable and the termination cable, and
a cable termination device configured to terminate the termination cable.

2. The power cable termination system as claimed in claim 1, wherein the termination cable is a plurality of order of magnitudes shorter than the power cable.

3. The power cable termination system as claimed in claim 1, wherein the power cable conductor and the termination cable conductor have the same electrical resistivity, wherein the termination cable conductor has a larger cross-sectional area than the power cable conductor.

4. The power cable termination system as claimed in claim 1, wherein the termination cable has a total length which is at most 100 metres.

5. The power cable termination system as claimed in claim 1, wherein the power cable is connected to the joint, the termination cable is connected to the joint, and the termination cable is directly connected to the cable termination device.

6. The power cable termination system as claimed in claim 5, wherein the termination cable has a portion mounted inside the cable termination device.

7. The power cable termination system as claimed in claim 1, wherein the cable termination device comprises an electrically insulating fluid.

8. The power cable termination system as claimed in claim 1, wherein the cable termination device is a dry cable termination device.

9. The power cable termination system as claimed in claim 1, wherein the cable termination device has an enclosure filled with a gel.

10. The power cable termination system as claimed in claim 1, wherein the termination cable is a power cable accessory.

11. The power cable termination system as claimed in claim 1, wherein the power cable is a high voltage power cable.

12. The power cable termination system as claimed in claim 1, wherein the power cable is a land power cable.

13. The power cable termination system as claimed in claim 1, wherein the power cable is a submarine power cable.

14. The power cable termination system as claimed in claim 1, wherein the power cable is a DC power cable.

15. The power cable termination system as claimed in claim 1, wherein the power cable is an AC power cable.

16. The power cable termination system as claimed in claim 2, wherein the power cable conductor and the termination cable conductor have the same electrical resistivity, wherein the termination cable conductor has a larger cross-sectional area than the power cable conductor.

17. The power cable termination system as claimed in claim 2, wherein the termination cable has a total length which is at most 100 metres.

18. The power cable termination system as claimed in claim 2, wherein the power cable is connected to the joint, the termination cable is connected to the joint, and the termination cable is directly connected to the cable termination device.

* * * * *